United States Patent Office 3,340,021
Patented Sept. 5, 1967

3,340,021
PROCESS FOR PREPARING THE IRON SALT OF COBALT HYDROCARBONYL AND COBALT HYDROCARBONYL
Gian Paolo Chiusoli and Giuseppe Mondelli, Novara, Italy, assignors to Montecatini Società Generale per l'Industria Mineraria e Chimica, Milan, Italy
No Drawing. Filed Jan. 23, 1964, Ser. No. 339,605
Claims priority, application Italy, Feb. 4, 1963, 2,319/63
2 Claims. (Cl. 23—360)

ABSTRACT OF THE DISCLOSURE

Process for preparation of cobalt hydrocarbonyl. This process comprises reacting powdered iron, cobalt chloride and carbon monoxide in aqueous medium in the presence of sulfur-containing promoters selected from the group consisting of sodium sulfide and sodium thiosulfate at a temperature from 0 to 70° C. and a pressure from 1 to 60 atmospheres. The reaction mixture is separated into liquids and solids. The liquids are acidified and the cobalt hydrocarbonyl is displaced by a carbon monoxide stream.

Our invention relates to a process for preparing the iron salt of cobalt hydrocarbonyl and cobalt hydrocarbonyl therefrom. More particularly, our invention relates to and has as an object a process for the preparation of the iron salt of cobalt hydrocarbonyl from pulverized iron, cobalt chloride and carbon monoxide in the presence of promoters, and obtaining the hydrocarbonyl, in turn, by acidifying the aqueous solution of the iron salt.

The iron salt is probably the hexahydrate corresponding to the formula $Fe(6H_2O)[Co(CO)_4]_2$. It is maintained in an aqueous solution, because it is unstable and decomposes partially when concentrating the solution by heat. The iron salt of cobalt hydrocarbonyl may be transformed into numerous derivatives by substituting organic binders for the water of coordination.

The importance of cobalt hydrocarbonyl as a catalyst in a large number of organic syntheses, such as oxosyntheses, is well known. The methods, described in technical literature, for preparing cobalt hydrocarbonyl require the use either of high pressures and high temperatures or expensive reactants (see Emmett-Catalysis, vol. V, pages 103–106, Rheinhold, New York, 1957); whereas our process is extremely simple and uses inexpensive raw materials.

To prepare the iron salt of cobalt hydrocarbonyl according to our invention, we contact pulverized iron with cobalt chloride at room temperature, under a slight pressure of carbon monoxide, in the presence of sulfur-containing promoters. The most suitable temperature range is 0–70° C., preferably 15–50° C, and the most suitable pressure range is 1–60 atm., preferably 10–30 atm. Finely divided iron is employed, and it is advisable to use commerical iron wool which, after a short period of time in a rotating mill, is converted completely into powder passing through a 325 mesh sieve.

The iron is employed in amounts equal to or larger than the stoichiometric amount according to the equation:

$$3Fe + 2CoCl_2 + 8CO + 6H_2O \rightarrow [Fe(6H_2O)][Co(CO)_4]_2 + 2FeCl_2$$

The preferred sulfur-containing promoters are sodium sulfide and sodium thiosulfate, which are added in amounts ranging from 1% to 20% by mole with respect to cobalt. However, after the initial reactions very small additions of promoter are necessary, if the same autoclave is employed. The sodium salt of cobalt hydrocarbonyl also forms in solution.

The method according to the invention may be carried out as follows. An oxygen-free aqueous solution of cobalt chloride, sulfur-containing promoters and then powdered iron are introduced into an autoclave equipped with a stirrer. Any air present is displaced first by nitrogen and then by carbon monoxide which is added to a pressure of 10–20 atm. of carbon monoxide. The mixture is stirred to allow carbon monoxide absorption, the pressure being re-adjusted to the desired level until theoretical absorption is reached or until satisfactory absorption with respect to the reaction rate is attained. The gas, containing small amounts of carbonyl, is discharged from the autoclave, while the solution is filtered in the absence of air. The solution contains mostly the iron salt of cobalt hydrocarbonyl, which can be determined by precipitation with phenanthroline. The anion can be precipitated with phenanthroline-nickel chloride. The iron salt of cobalt hydrocarbonyl can be also transformed into a sodium salt, extractable with petroleum ethers, by treatment with sodium sulfide. To prepare cobalt hydrocarbonyl, the solution obtained as above is acidified with a mineral acid, preferably hydrochloric acid at 0° C., in a carbon monoxide stream to prevent decomposition of the hydrocarbonyl.

The invention will be described further in conjunction with the following specific examples which are in no wise intended to limit the scope of the invention, but are to serve merely for the purposes of illustration.

Example 1

1200 cc. of an oxygen-free aqueous solution of hexahydrate cobalt chloride, equivalent to 44.4 g. of cobalt, were placed into a 2-liter horizontal stainless steel autoclave equipped with a stirrer (250 rotations/minute) and a water jacket. 6 g. anhydrous sodium sulfide and 15 g. commercial sodium pentahydrate thiosulfate were added with stirring in the absence of air. 60 grams of pulverized iron, obtained from commercial iron wool, were then introduced and a pressure of 15 atm. carbon monoxide was maintained. The mixture was stirred and the initial pressure was restored, when it dropped to 13 atm. Stirring was continued until about 55 liters of carbon monoxide (brought again to 0° C. and 760 mm. Hg) were absorbed. The reaction time was 9 hours. The gas was discharged by passing it through bromine water absorbers which retained 0.3 g. of carbonyls. The autoclave was evacuated and its contents were filtered in the absence of air. The solution was acidified at 0° C. by 2 N hydrochloric acid in a carbon monoxide stream and yielded cobalt hydrocarbonyl in amounts equivalent to approximately 30.5 g. of metal cobalt.

The quantity of cobalt hydrocarbonyl was assayed by collecting the gas evolved from the acidification of the iron salt solution in bromine water, whereby it was decomposed to cobalt bromide. A small portion of it, about 10%, was transformed into cobalt carbonyl which remained in the acidified mixture. Analogous results were obtained by determining cobalt carbonyl anions by means of the phenanthroline method. Cobalt chloride equivalent to approximately 5.5 g. metal cobalt and iron chloride corresponding to about 45 g. metal iron were found in the acidified mixture.

The solid, obtained from the filtered crude material, was air-dried in an oven and weighed 36.8 g., corresponding approximately to 13 g. iron, 8.3 g. cobalt and 3.5 g. sulfur. From the wet filter pad, 5.5 g. of cobalt and 0.25 g. iron as carbonyls were extracted by washing with heptane.

Example 2

The procedure of Example 1 was repeated except that the temperature was kept at about 60° C. and the pressure at about 18–20 atmospheres. The reaction was stopped after 80 minutes. By adding hydrochloric acid, to the aqueous solution filtered off, cobalt hydrocarbonyl was produced in the amount equal to 29 g. of metal cobalt.

We claim:
1. A process for preparing cobalt hydrocarbonyl, which comprises reacting powdered iron, cobalt chloride and carbon monoxide in aqueous medium in the presence of sulfur-containing promoters selected from the group consisting of sodium sulfide and sodium thiosulfate at a temperature from 0 to 70° C. and a pressure from 1 to 60 atmospheres, separating the reaction mixture into liquids and solids, acidifying the liquids and displacing the cobalt hydrocarbonyl by a carbon monoxide stream.

2. A process for preparing cobalt hydrocarbonyl, which comprises reacting powdered iron, cobalt chloride and carbon monoxide in aqueous medium in the presence of sulfur-containing promoters selected from the group consisting of sodium sulfide and sodium thiosulfate in a ratio of 1 to 20 mole percent to cobalt, said powdered iron:cobalt chloride being in a ratio of 3 gram atoms:2 moles, at a temperature from 15 to 50° C. and a pressure from 10 to 30 atmospheres, separating the reaction mixture into liquids and solids, acidifying the liquids and displacing the cobalt hydrocarbonyl by a carbon monoxide stream at 0° C.

References Cited

UNITED STATES PATENTS 2,992,275   7/1961   Niwa et al. _____ 23—203

OSCAR R. VERTIZ, *Primary Examiner.*

H. S. MILLER, *Assistant Examiner.*